Dec. 1, 1970  J. A. STAPENHILL  3,543,308
VISOR
Filed Dec. 19, 1966  2 Sheets-Sheet 1
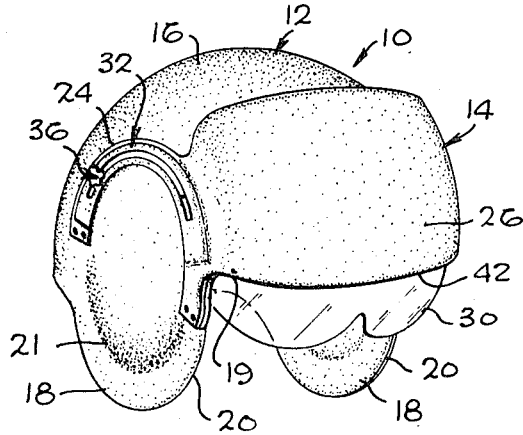
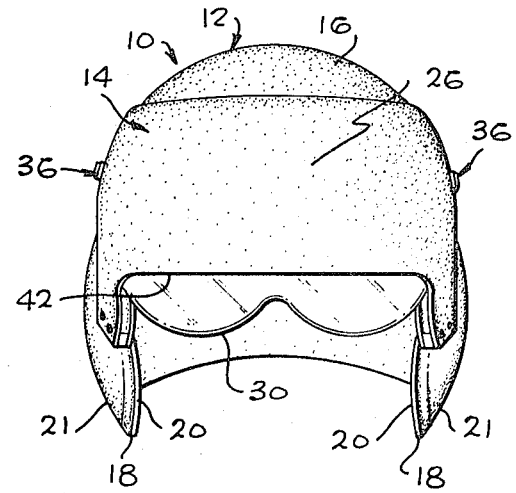
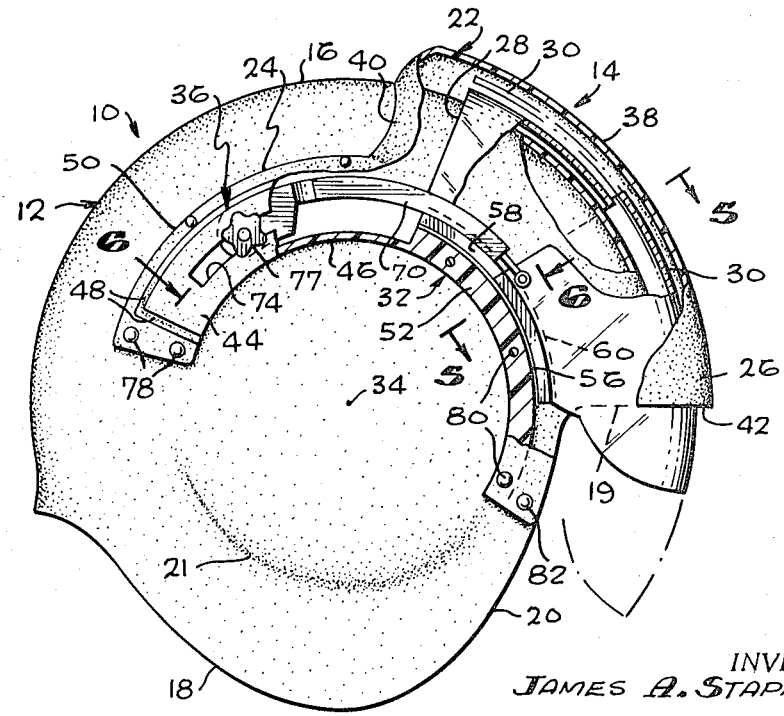
INVENTOR.
JAMES A. STAPENHILL
BY
Beehler & Arant
ATTORNEYS Dec. 1, 1970   J. A. STAPENHILL   3,543,308
VISOR
Filed Dec. 19, 1966   2 Sheets-Sheet 2
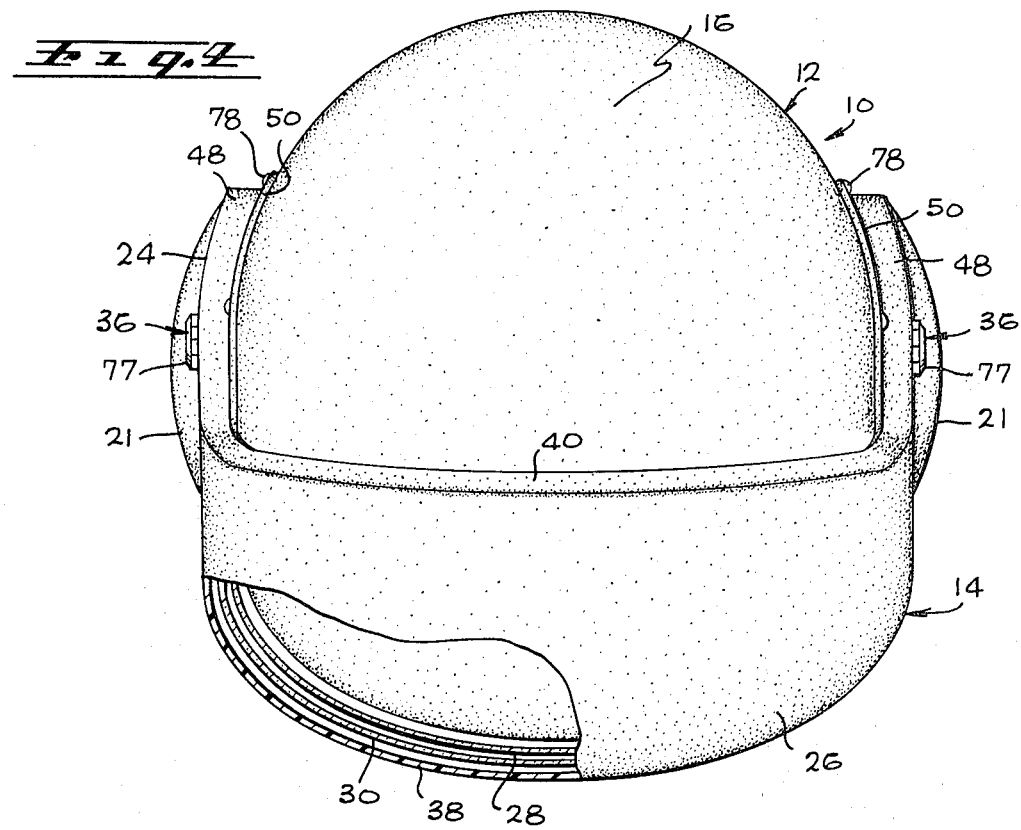
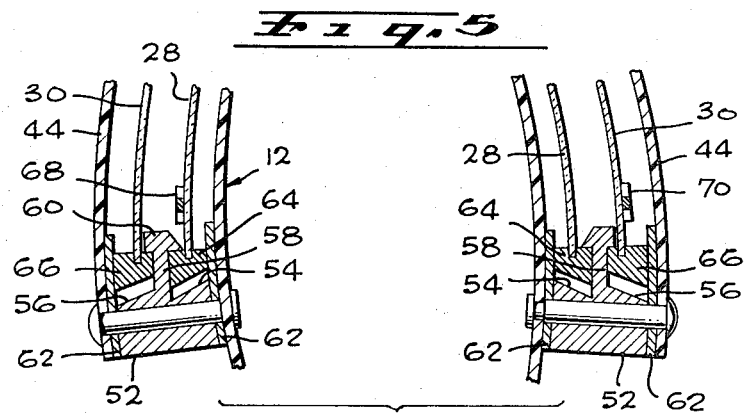
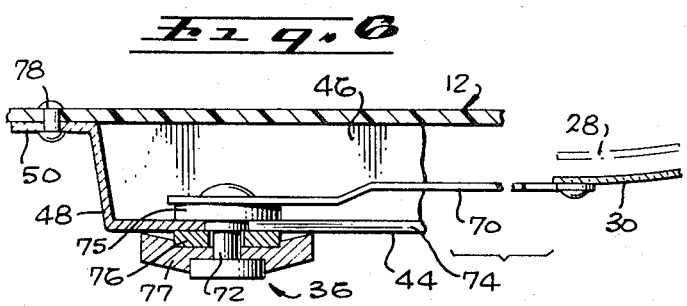
JAMES A. STAPENHILL
INVENTOR.
BY
Beehler & Arant
ATTORNEYS

United States Patent Office 3,543,308
Patented Dec. 1, 1970

3,543,308
VISOR
James A. Stapenhill, Glendora, Calif., assignor to Sierra Engineering Company, Sierra Madre, Calif., a corporation of California
Filed Dec. 19, 1966, Ser. No. 608,948
Int. Cl. A42b 3/02
U.S. Cl. 2—6         5 Claims

ABSTRACT OF THE DISCLOSURE

An arcuate visor extending over a protective helmet from one side to the other with sides of the visor mounted in arcuate tracks, having a location generally around the perimeter of the ear, there being a visor covering acting as a frame provided with tracks at the sides within which the visor is guided. There is an extension at the side of the visor extending beyond the tracks upon which is mounted a tightening device provided with a knob capable of being operated by hand. On some occasions there are two visors rotating about a common axis of rotation, each of which is mounted in a track, the tracks of the different visors being adjacent to each other and each visor being provided with a manually actuated tightening device, all for the purpose of moving the visor between positions in front of the wearer's line of vision and a position retracted therefrom.

---

This invention relates generally to protective headgear and, more particularly, to a novel dual visor means and a protective helmet embodying the visor means.

Visor means are commonly worn by aircraft pilots and other persons whose activities require shielding of the eyes against relatively intense light or glare, wind, airborne particles, and other external conditions which tend to impair vision. However, the external conditions which create the need for such eye protection generally vary. For example, the light conditions to which a pilot is exposed may vary between the extremes of intense sunlight or glare and relative darkness, while the need for physical protection of the eyes may remain. On other occasions, it may be desirable or necessary for a pilot to wear visor means under conditions which impose no necessity of shielding the eyes and/or render it inconvenient or undesirable to have a visor positioned in front of the wearer's eyes. A similar varying need for eye shielding exists in the case of persons engaged in other activities than flying which require eye protection against the external conditions mentioned above.

It is evident at this point, therefore, that an ideal visor means is one which permits quick and easy adjustment of its effective light transmission or light attenuating characteristics, thus to accommodate the visor means for use throughout the range of light conditions between extremes of intense sunlight or glare and relative darkness. The ideal visor means will also embody means for retracting its transparent eye shield, referred to herein as a transparent visor or simply a visor, from the wearer's field of vision, when desired, without removal of the entire visor means.

Most, if not all, activities which involve need for eye protection against the conditions mentioned also involve the need for protecting the head against injury. For this reason, persons engaged in such activities commonly wear protective helmets. Complete protective headgear for these persons, therefore, consist of a combined protective helmet and visor means. The ideal visor means for this purpose will possess, in addition to the features mentioned above, the capability of being installed, at the time of manufacture, on a helmet which is specifically designed to receive the visor means, or installed later on an existing helmet, either to provide the latter with eye protection or to replace an existing visor means on the helmet. The means for adjusting the effective light transmission or light attenuating characteristics of the visor means must, of course, be conveniently accessible to the helmet wearer and be capable of simple and rapid manipulation by the wearer.

It is a general object of the present invention to provide novel visor means, and a protective helmet embodying the visor means, which satisfy the foregoing and other idealized requirements.

Other objects of the invention are concerned with providing visor means, and a protective helmet embodying the visor means, which are relatively simple in construction, economical to manufacture, capable of simple and rapid adjustment by the wearer to vary the effective light transmission or light attenuating characteristics of the visor means as well as to retract and extend the visor means from and into the wearer's field of vision, compact, lightweight, low in profile, and otherwise ideally suited to their intended purposes.

A further object of the invention is to provide visor means of the character described embodying one or more transparent visors which are retractable into a housing when not in use for protection against scratching or other damage.

Further objects, advantages, and features of the invention will become readily evident as the description proceeds.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

FIG. 1 is a perspective view of a dual visor helmet constructed in accordance with the invention;

FIG. 2 is a front elevation on a slightly enlarged scale of the helmet in FIG. 1;

FIG. 3 is an enlarged side elevation of the helmet with the visor means broken away for the sake of clarity;

FIG. 4 is an enlarged top plan view of the helmet with the visor means broken away for the sake of clarity;

FIG. 5 is an enlarged fragmentary section taken on line 5—5 in FIG. 3; and

FIG. 6 is an enlarged fragmentary section taken on line 6—6 in FIG. 3.

The dual visor helmet 10 of the invention which has been selected for illustration in these drawings includes a protective helmet 12 proper and dual visor means 14 secured to the outside of the helmet. Helmet 12 is conventional and, accordingly, need not be described in detail. Suffice it to say that the helmet has a generally semispherical crown 16 and depending side lobes 18. The front of the crown projects forwardly of the side lobes, as shown, and defines a downwardly presented, forwardly arching crown edge 19 which extends horizontally across the helmet just above the level of the wearer's eyes and merges at its ends with the front edges 20 of the helmet side lobes 18. The sides of the helmet 12 have generally circular, spherically curved protrusions 21 which define within the helmet shallow clearance recesses for the wearer's ears. Helmet 12 has a front face opening which is bounded by the crown edge 19 and the front lobe edges 20. It will be understood that suitable means, such as a chin strap, will be provided for retaining the helmet on the wearer's head.

The primary contribution of the present invention resides in the unique construction and arrangement of the visor means 14. Generally speaking, this visor means comprises a frame 22 having side portions 24 which straddle the sides of the helmet 12 and a central portion 26 which extends across the front side of the helmet crown 16, just above the front crown edge 19. Also included in the visor means are a pair of transparent visors 28 and 30 which extend between and have ends located adjacent the side portions 24, respectively, of the visor frame 22. Visor 28 is disposed adjacent the helmet 12 and, for this reason, is referred to as an inner visor. Visor 30 is located outwardly of the visor 28 and is referred to as an outer visor. The ends of the visors 28, 30 are secured to the visor frame 22 by coacting rotary mounting means 32 on the visors and frame. These mounting means support the visors for independent fore and aft rotation relative to the helmet 12 about a common rotation axis 34 passing substantially through the centers of the helmet side protrusions 21. Each visor is rotatable forwardly and downwardly relative to the helmet to an extended position of use wherein the visor is situated in the field of vision of the wearer. Each visor is rotatable upwardly and rearwardly to a retracted position in which the visor is located out of the wearer's field of vision. The solid lines in FIG. 3, for example, illustrate the inner visor 28 in its fully retracted position and the outer visor 30 in a partially extended position. The broken lines in FIG. 3 illustrate the outer visor in its fully retracted and fully extended positions, respectively. Releasable locking means 36 are provided for releasably securing the visors in their extended and retracted positions. The locking means for the inner visor 28 are located at one side of the helmet 12, and the locking means for the other visor are located at the opposite side of the helmet. This side placement of the visor locking means locates such locking means in the most convenient position to the wearer and, in addition, provides the helmet with a desirable low profile.

Referring now in greater detail to the visor means 14, the visor frame 22 has a relatively thin walled construction of generally uniform wall thickness. This frame may be fabricated in any convenient way from plastic or other suitable material. The central portion 26 of the visor frame has a wall 38 which is spaced a distance from and has substantially the same curvature as the underlying surface of the helmet crown 16. Along the rear upper edge of the frame wall 38 is an inwardly directed seating flange 40 which seats against the outer surface of the helmet to space the frame wall from the helmet. Visors 28, 30, when retracted, are disposed within the space between the helmet and the visor frame wall 38. The central visor frame portion 26 thus defines, in effect, a housing for containing the retracted visors and shielding the latter against scratching or other damage. The lower front edge 42 of the frame wall 38 is located substantially in a common horizontal plane with the front crown edge 19 of the helmet 12 and defines with the latter helmet edge an opening to the interior of the frame housing 26 through which the visors 28, 30 move between their extended and retracted positions. The visors have substantially the same curvature as the frame wall 38 and the underlying helmet surface, whereby the latter surface, the frame wall, and the visors are generally uniformly spaced over their entire area, as shown.

The side portions 24 of the visor frame 22 are disposed substantially in parallel planes and have similar, generally semicircular shapes which are mirror images to one another. Each frame side portion curves about the upper half of the adjacent side protrusion 21 of the helmet 12 and includes a circularly curved wall 44 which merges smoothly with the visor housing wall 38. The rear end of each visor frame side wall 44 extends rearwardly from the visor housing 26. The front end of each frame side wall depends below the housing, as shown. Along the inner edge of each frame side wall 44 is an inwardly directed flange 46 which seats against the helmet 12 about the boundary of its adjacent side protrusion 21.

Along the outer and rear end edges of the visor frame side walls 44 are inwardly directed walls 48 having inner mounting flanges 50 which also seat against the helmet. The walls 48 and seating flanges 50 merge with the rear seating flange 40 on the visor housing 26. The forward, depending ends of the frame side walls 44 extend downwardly along opposite sides of the front face opening of the helmet 12, flush with the front edges 20 of the helmet lobes 18.

The rotary mounting means 32 for the transparent visors 28, 30 comprise curved blocks 52 which are interposed between the helmet 12 and the visor frame side walls 44. These blocks have longitudinally extending inner and outer channels 54, 56, respectively. The upstanding ribs 58 defined between the two channels 54, 56 in each block 52 has a retaining shoulder 60 along its edge which projects laterally over the adjacent channels, as shown best in FIG. 5. Interposed between blocks 52 and the helmet 12 and adjacent visor frame side walls 44 are curved plates 62 which form the inner walls of the inner channels 54 and the outer walls of the outer channels 56, respectively. As will appear from the ensuing description, these channels serve as guide tracks and, for this reason, are hereafter referred as guide tracks. Referring to FIG. 3, it will be observed that the blocks 52, plates 62, and the guide tracks 54, 56 defined by the blocks and plates are circularly curved about the visor rotation axis 34 as a center. The visor mounting means 32 further comprise inner and outer guide shoes 64 and 66 which are grooved to receive and are adhesively bonded or otherwise secured to the ends of the inner and outer visors 28, 30, respectively. Guide shoes 64, 66 are circularly curved about the rotation axis 34 as a center and are slidably disposed within the inner and outer guide tracks 54, 56, respectively. The guide shoes are retained in their respective tracks by the shoulders 60 on the central block ribs 58. It is now evident that the visor mounting means 32 support the visors 28, 30 on the visor frame 22 for fore and aft rotation about the axis 34 between their extended and retracted positions, referred to earlier.

The locking means 36 for releasably securing the visors 28, 30 in their extended and retracted positions comprise circularly curved control arms 68 and 70 which are secured to and extend rearwardly from the visors, respectively. The control arm 68 for the inner visor 28 extends rearwardly through the righthand side portion 24 of the visor frame 22, as the latter is viewed from the front. The control arm 70 for the outer visor 30 extends rearwardly through the opposite, lefthand side frame portion 24. These control arms have outwardly offset rear ends which are disposed adjacent and along the longitudinal centerlines of the side frame walls 44, as shown. Secured to the rear end of each control arm is a lockscrew 72 which extends outwardly through a curved longitudinal slot 74 in the adjacent side frame wall. Each lockscrew 72 mounts an inner bearing washer 75 which seats against the inner surface of the adjacent side frame wall 44, an outer washer 76 which seats against the outer surface of this wall, and a control knob 77 which is secured to the outer end of the lockscrew, outwardly of the outer bearing washer. The control knobs 77 are rotatable to selectively urge the bearing washers 75, 76 into clamping engagement with the intervening side frame wall 44 and to release the clamping pressure on the washers, thus to secure the visors 28, 30 against and release the visors for movement between their extended and retracted positions. It is evident at this point, therefore, that each visor 28 and 30 can be independently secured in its extended and retracted positions and released from movement between these positions by rotating the corresponding control knob. The control knobs 77 also provide grips or handles for extending and retracting the visors.

The placement of the control knobs 77 at the sides of the helmet 12 has a two-fold advantage. First, this placement locates the control knobs in the most convenient position to the wearer. In this regard, for example, it is evident that the wearer may operate the control knobs to extend and retract the visors without obscuring his vision. A second advantage of the side placement of the control knobs is that this placement provides the helmet with a desirable low profile.

The visor means 14 are designed for attachment to the helmet 12 at the time of manufacture or for subsequent attachment to an existing helmet, either to provide the latter with visor means or to replace other visor means on the existing helmet. To this end, the visor frame 22 is provided with any convenient means of attachment to the helmet. The illustrated visor means, for example, are secured to the helmet 12 by means of rivets 78 which extend through the mounting flanges 50 of the visor frame 22 and rivets 80 which extend through the visor side frame walls 44, and the visor track blocks 52 and plates 62. Additional rivets 82 are placed, as shown, for limiting movement of the visors 28, 30 to their extended positions.

Visors 28, 30 may have any desirable light transmitting or attenuating characteristics. In a typical dual visor helmet according to the invention, for example, one of the visors will comprise a clear transparent plastic and the other visor will comprise a tinted transparent plastic. In this case, the clear visor serves primarily as a shield for protecting the wearer's face and eyes against wind, airborne particles, and the like. The tinted visor serves to shield the wearer's eyes against intense light and glare. In some cases, on the other hand, both visors may be tinted to provide greater latitude of adjustment of the effective light attenuation provided by the visors. In this regard, of course, it is obvious from the preceding description that either visor may be extended independently of the other or both visors may be extended simultaneously. As noted earlier, the visors, when retracted, are contained within the visor frame housing 26 and are thereby shielded against scratching and other damage.

It is now obvious, therefore, that the invention herein described and illustrated is fully capable of attaining the several objects and advantages preliminarily set forth.

While the invention has herein been shown and described in what is conceived to be the most practical and preferred embodiment, it is recognized that departures may be made therefrom within the scope of the invention, which is to be accorded the full scope of the claims so as to embrace any and all equivalent devices.

What is claimed as new in support of Letters Patent is:

1. A visor device for attachment to a protective helmet comprising a visor frame forming a visor cover including spaced fore and aft curved side portions and an arcuate central portion extending between and joining said side portions, said cover being shaped in conformance with the contour of the helmet above the wearer's field of vision and adapted to be mounted on said helmet at a radially outwardly spaced location therefrom, an arcuate spacer on the inside of each side portion conforming in curvature to said side portion and to the adjacent surface of the helmet, each said spacer forming a track, an extension of said cover extending rearwardly from one of said side portions and in substantial alignment with the rearward end of the respective track, said extension having a longitudinal slot therein, an arcuate visor having curvature of a radius intermediate the radii of curvature respectively of said cover and said helmet, an arcuate side edge on each side of said visor and an arcuate guide shoe integrally secured to each said side edge, said shoe being thicker than said visor and forming a rigid assembly therewith, one of said guide shoes being located in each said track and slidable therein to advance and retract said visor relative to said cover, a lock screw extending from inside said extension through said slot therein to the outside, a control knob on the outside end of said lock screw, and a control arm having a pivot connection at one extremity thereof to the lock screw and another pivot connection from the other extremity of the control arm to the visor adjacent the rear edge of the visor and adjacent the shoe on the respective side edge, the longitudinal axis of said control arm being substantially in close parallel relationship with the longitudinal axis of said shoe, whereby to extend and retract said visor by movement of said knob and to lock said visor in selected positions of extension and retraction.

2. A visor device as in claim 1 wherein there is a second visor having a curvature of radius different from the radius curvature of said first mentioned visor whereby to nest one visor inside the other and wherein there is a second extension of said cover on the side of said cover opposite said first mentioned extension and similar to said first mentioned extension, a second lock screw and control knob therefor and a second control arm between the second lock screw and the second visor adjacent the rear edge of the second visor and the respective shoe, the longitudinal axis of said second control arm being substantially in close parallel relationship with the longitudinal axis of the respective shoe.

3. A visor device as in claim 2 wherein the extensions are each an integral molded part of the cover and wherein the respective slots extend forwardly to a location overlying the cover itself.

4. A visor device for attachment to a protective helmet comprising a visor frame forming a visor cover including spaced fore and aft curved side portions and an arcuate central portion extending between and joined said side portions, said cover being shaped in conformance with the contour of the helmet above the wearer's field of vision and adapted to be mounted on said helmet at a radially outwardly spaced location therefrom, an arcuate spacer on the inside of each side portion conforming in curvature to said side portion and to the adjacent surface of the helmet, each said spacer forming a track, an extension of said cover extending rearwardly from one of said side portions and in substantial alignment with the rearward end of the respective track, said extension having a longitudinal slot therein, an arcuate visor having curvature of a radius intermediate the radii of curvature respectively of said cover and said helmet, an arcuate side edge on each side of said visor and an arcuate guide shoe integrally secured to each said side edge, said shoe being thicker than said visor and forming a rigid assembly therewith, one of said guide shoes being located in each said track and slidable therein to advance and retract said visor relative to said cover, locking means extending from inside said extension through said slot therein to the outside, a control knob on the outside end of said locking means, and a control arm having a pivot connection at one extremity thereof to said locking means and another pivot connection from the other extremity of the control arm to the visor adjacent the rear edge of the visor and adjacent the shoe on the respective side edge, the longitudinal axis of said control arm being substantially in close parallel relationship with the longitudinal axis of said shoe, whereby to extend and retract said visor by movement of said knob and to lock said visor in selected positions of extension and retraction.

5. A visor device as in claim 4 wherein there is a second visor having a curvature of radius different from the radius curvature of said first mentioned visor whereby to nest one visor inside the other and wherein there is a second extension of said cover on the side of said cover opposite said first mentioned extension and similar to said first mentioned extension, a second locking means and control knob therefor and a second control arm between the second locking means and the second visor adjacent the rear edge of the second visor and the respective shoe, the longitudinal axis of said second control arm being substantially in close parallel relationship with the longitudinal axis of the respective shoe.

References Cited

UNITED STATES PATENTS

| | | | |
|---|---|---|---|
| 2,445,355 | 7/1948 | Hurt | 2—10 |
| 2,813,271 | 11/1957 | Finken | 2—6 |
| 3,315,272 | 4/1967 | Olt et al. | 2—6 XR |
| 3,368,220 | 2/1968 | Wenzel | 2—8 |
| 1,416,848 | 5/1922 | Lightfield | 2—10 XR |
| 1,683,170 | 9/1928 | Di Carlo. | |
| 2,590,526 | 3/1952 | Evans | 2—8 |
| 3,239,843 | 3/1966 | Lobelle | 2—6 |

JAMES R. BOLER, Primary Examiner